United States Patent Office 3,532,679
Patented Oct. 6, 1970

3,532,679
HYDROGELS FROM CROSS-LINKED POLYMERS OF N-VINYL LACTAMS AND ALKYL ACRYLATES
Robert Steckler, 9 E. Hamill Road,
Baltimore, Md. 21210
No Drawing. Filed Apr. 7, 1969, Ser. No. 814,209
Int. Cl. C08f 15/40
U.S. Cl. 260—80.72                    12 Claims

ABSTRACT OF THE DISCLOSURE

Hydrophilic three-dimensional polymer networks (hydrogels) having excellent water permeability and mechanical properties are obtained by the simultaneous polymerization and cross-linking of a mixture of an N-vinyl lactam, an alkyl acrylate and a cross-linking agent in the presence of a free radical catalyst such as organic peroxides, azobisisobutyronitrile, etc., and in the absence of oxygen (atmospheric) at a temperature ranging from ambient to 70° C. The resulting rigid gel may be, if desired, post cured at about 100° C. to yield rigid clear masses which can be fabricated into various sizes and shapes for manifold industrial applications, or swelled in water or in aqueous germicidal solutions until a water content of 80–95% is reached to yield transparent hydrogels having excellent shape and volume stability and other excellent physical properties.

---

It is known that sparingly cross-linked polymeric hydrogels, i.e., hydrophilic three-dimensional polymer networks, can be prepared by several methods. For the preparation of such hydrophilic gels, the usual method consists of simultaneously polymerizing a monomeric acrylic acid ester or methacrylic acid ester in which the ester moiety contains one or more hydrophilic groups, such as hydroxy, and cross-linking the monomer as it polymerizes with a cross-linking agent such as a polyethyleneglycol dimethacrylate in an amount not to exceed one mole percent of said monomer in the presence of a redox initiator at a temperature of about 50° C. for a period of time sufficient to yield the desired hydrogel. Depending upon the polymerization method employed, the characteristics of the hydrogels will differ. For example, by the bulk polymerization procedure, in the absence of water or diluent, the product is a hard and brittle resin swellable in water to the point of becoming a soft gel. The maximum water content in the resulting gel as reported by Refojo and Yasuda, Journal of Applied Polymer Science, vol. 9, 2425–35, 1965, is around 37.5%.

When water is employed as the solvent for the polymerization of the monoester, such as, for example, commercial grade 2-hydroxyethyl methacrylate (containing about 0.1% ethylene glycol dimethacrylate and about 3% methacrylic acid), with a redox initiator system, the polymerization proceeds to yield a gel or an opaque and porous sponge. The maximum amount of water that is maintained by the gel is about 40%. However, when the same monomer, i.e. 2-hydroxyethyl methacrylate as above constituted, is polymerized and cross-linked with 0.3% to 1.6% of tetraethyleneglycol dimethacrylate in an ethylene glycol-water system with persulfate-bisulfite initiator, a gel is obtained which is converted to a transparent gel upon equilibration in water. The maximum amount of water which can be maintained in the transparent gel is about 43%.

From the foregoing procedures which are described in more detail by M. F. Refojo and H. Yasuda, Journal of Applied Polymer Science, vol. 9, pp. 2425–2435 (1965) and by Otto Wichterle et al. in their U.S. Pats. 2,976,576 and 3,220,960, it becomes clearly evident that to prepare hydrophilic three-dimensional polymer networks (hydrogels) it is essential that a water soluble monoester of acrylic or methacrylic acid and of a polyfunctional alcohol having an esterifiable hydroxyl group be employed in the simultaneous polymerization and cross-linking with ethylene glycol dimethacrylate or polyethyleneglycol dimethacrylate at temperatures ranging about 50 to 80° C.

It is also known that N-vinyl lactams, especially N-vinyl-2-pyrrolidone, can be polymerized by adding to an aqueous solution of the monomer containing from 0.01 to 0.33% by weight of cross-linking agent such as ferric chloride a sufficient quantity of catalyst such as 35% aqueous hydrogen peroxide and an activator such as ammonium hydroxide to yield from colorless to yellow gels of the consistency of an ordinary laboratory rubber-stopper. The resulting gels are not permeable to water and hence cannot be considered as hydrogels. If the gel or rubber-like consistency is heated to remove the small quantity of water present therein, a hard, opaque and glassy product is obtained which is now insoluble in water and in all common classes of organic solvents. In short, these gels of rubber-like consistency are water-insoluble and water unswellable polymers of N-vinyl-2-pyrrolidone or whatever other N-vinyl lactam that is employed in the polymerization and cross-linking reactions. In view of their insolubility in water and in all common organic solvents, and their incapability of swelling in water, the gels are not hydrophilic three-dimensional polymer networks (hydrogels) as obtained by the procedures described in the aforementioned references.

Contrary to the acceptable procedures described in the aforementioned references, I have found that it is not necessary to employ monomeric esters of acrylic or methacrylic acid, in which the ester moiety (alcohol chain) contains hydrophilic groups, to obtain gels having excellent shape and volume stability. By simultaneously copolymerizing and cross-linking a mixture of comonomers consisting of from 60% to 90% by weight of N-vinyl lactam and 40% to 10% of an acrylate ester monomer, and from about 0.5% to about 12% by weight of a polyethyleneglycol dimethacrylate in the presence of from about 0.05 to 1.0% by weight, preferably about 0.4% by weight, of a free radical catalyst such as any one of the well known organic peroxides or preferably azobisisobutyronitrile, and in the absence of atmospheric oxygen at a temperature ranging from about 35° to 60° C., a clear and rigid polymeric gels are obtained which swell in water to yield transparent hydrogels having excellent shape or body retaining characteristics and excellent volume stability, and other excellent physical properties.

The simultaneous copolymerization and cross-linking may be conducted by the bulk polymerization method in which case a rigid and clear glassy polymer is obtained which can be, if desired, post cured at about 100° C. and then fabricated into various sizes and shapes for optical, medical, or industrial applications. The product may be cut into plates or sheets, washed well in water and employed as body implants to fill or divide cavities in the human or animal body, and the like, or the cut plates or sheets immersed in water or aqueous germicidal solutions for a period of time until equilibrium is attained corresponding to a water content from 35% to as high as 95%. The resulting hydrogels have excellent shape and volume stability.

The simultaneous copolymerization and cross-linking may also be conducted in a water system, i.e. water employed as the fluid vehicle for the reactants. The N-vinyl lactam monomer is soluble in water, whereas the alkyl acrylate and cross-linking agent are not and are readily dispersed in the vehicle by agitation during the initial stages of the copolymerization and cross-linking reaction.

The product resulting from the latter reaction is a clear transparent gel which continues to swell to equilibrium when in contact with water. After a contact of 48 hours, water content in the gel reaches equilibrium at close to 95%. The water from the resulting hydrogel can be removed in part by squeezing thus indicating that the hydrogel has water absorbing properties which are useful when employing the hydrogel in ultrafiltration or as adhesion pads or layers for dental prostheses.

The simultaneous copolymerization and cross-linking is also effectively conducted in the presence of organic solvents in which the comonomers, i.e., N-vinyl lactams, alkyl acrylates and polyethyleneglycol dimethacrylates, are soluble. Such solvents include the lower aliphatic alcohols such as methanol, ethanol, propanol, isopropanol; acetone, dioxane, ethylene glycol, glycol ethers and the like. The resulting gel can be further swelled by immersion in water, whereby the absorbed organic solvent in the gel is replaced by water, and subsequently removed by washing or distillation or evaporation.

If the hydrogel, which may contain from 35% to 95% of water, is to be employed in the fabrication of lenses or pessaries, it is desirable that either methanol or ethanol or tert. butanol, or ethylene glycol be employed as the solvent during the simultaneous copolymerization and cross-linking reaction, since these solvents are readily displaced by a water wash or during the swelling of the hydrogel when in prolonged contact with water. In other words the alcohol or glycol or other solvent can be completely removed from the hydrogel.

As examples of N-vinyl lactams that are employed in the simultaneous copolymerization with alkyl acrylates, the following are illustrative:

N-vinyl-2-pyrrolidone
N-vinyl-2-piperidone
N-vinyl-ε-caprolactam which may be substituted in the lactam ring by one or more lower alkyl groups such as methyl, ethyl or propyl.

Instead of the above N-vinyl lactams, other heterocyclic N-vinyl monomers may be employed as the comonomer with the alkyl acrylate. As illustrative examples of such, N-vinyl imidazole, N-vinyl succinimide, N-vinyl diglycolylimide, N-vinyl glutarimide, N-vinyl-3-morpholinone, N-vinyl-5-methyl-3-morpholinone, etc., may be effectively employed alone or in admixture with another N-vinyl lactam monomer to give hydrogels having the foregoing desirable characteristics.

The alkyl acrylates, i.e. the acrylate ester monomers, that are employed as the comonomers with the foregoing N-vinyl lactams and heterocyclic N-vinyl monomers, have the following formula:

$$CH_2=CHCOOR$$

wherein R is an alkyl of from 1 to 4 carbon atoms, i.e., methyl, ethyl, propyl or butyl. Methyl acrylate is, however, preferred since it produces hydrogels with superior toughness. The higher alkyl acrylates, i.e. ethyl, propyl or butyl acrylate give very little if any advantage over methyl acrylate in the final hydrogel product, It is also possible to obtain desirable hydrogels by employing vinyl acetate or vinyl propionate in the amount of 30%–40% by weight with 60%–70% by weight of N-vinyl lactam or any one of the above illustrated heterocyclic N-vinyl monomers. Similarly, the acrylate ester monomers may be replaced by methyl, ethyl, propyl, or butyl-methacrylate.

Monohydroxy or monoalkoxy polyethoxy acrylates and methacrylates such as, for example:

polyethylene glycol monoacrylate
polyethylene glycol monomethacrylate
methoxy polyethylene glycol acrylate or methacrylate
ethoxy polyethylene glycol acrylate or methacrylate
propoxy polyethylene glycol acrylate or methacrylate
butoxy polyethylene glycol acrylate or methacrylate and their obvious equivalents may be employed as extenders or as partial replacement of the N-vinyl lactam or other heterocyclic N-vinyl monomers to the extent of 5% to 50% by weight. The obvious equivalents of such compounds may be characterized by the following formula:

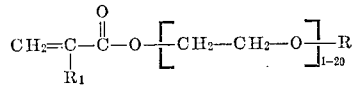

wherein R is a lower alkyl group ranging from methyl to butyl or a hydrogen atom, and $R_1$ is either hydrogen or methyl.

The polyethylene glycol dimethacrylates that are employed as the cross-linking agents are characterized by the following formula:

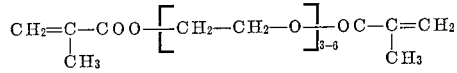

and include the following representative species:

triethylene glycol dimethacrylate
tetraethylene glycol dimethacrylate
pentaethylene glycol dimethacrylate
hexaethylene glycol dimethacrylate the preferred species being tetraethyleneglycol dimethacrylate or a blend of a 40–60 mixture by weight of triethylene glycol dimethacrylate and tetraethylene glycol dimethacrylate.

The copolymerization and cross-linking reaction may be conducted with 80 parts by weight of the N-vinyl lactam or any one of the heterocyclic N-vinyl monomers referred to above, 20 parts by weight of the acrylate ester monomer, 1 part by weight of cross-linking agent and 0.4 parts by weight of catalyst at a temperature of about 35°–60° C., preferably about 50° C., in the absence of atmospheric oxygen, in a mold conforming to the shape of the desired product or in a conventional polymerization tray or glass sheet casting cell, for a period of about 6–18 hours. The resulting hard or rigid cross-linked copolymer may be post cured in the same mold or cell for about 1 hour at 100° C. to give a firm, rigid and clear copolymeric product which can be fabricated into various sizes and shapes, or cut into the shape of the desired product. The fabricated product can then be swelled in water until equilibrium is reached or until a hydrogel containing the desired amount of water is reached, the preferred amount of water adsorption being from 80% to 95%. The resulting hydrogels may be employed for the same purposes as those enumerated by the prior art, such as in dentistry, surgery, opthalmology, and the like.

The hydrogels prepared in accordance with the present invention are extremely high in water transmission rate (water permeability) at 27° C. (gm.) (mil)/(m.²) (24 hours), ranging from 50,000 to 600,000. The water permeability of the hydrogels to water was determined by the conventional inverted cup procedure.

These values compare to published figures as follows:

| | Water content, percent | Water transmission |
|---|---|---|
| Rabbit cornea | 78 | 520,000 |
| Polyhydroxyethyl methacrylate | 39 | |
| Polyhydroxypropyl acrylate | 47 | 30,000 |

The cross-linked copolymer that had been post cured at 100° C. for about 1 hour may be immersed without deterioration in an aqueous sterilizing solution such as aqueous 1% benzyltrialkonium chloride solution until the desired amount is absorbed in the resulting hydrogel. The sterilized hydrogel may be employed in dental work.

The hydrogels prepared in accordance with the present invention are extremely resistant to steam, hot inorganic acids and bases, chemical gases, such as sulfur dioxide and trioxide; micro organisms and the common enzymes.

In other words, they are very stable to chemical reagents, i.e. very inert and will not deteriorate or decompose in contact therewith.

The excellent shaping capability and the volume stability of the hydrogels prepared in accordance with the present invention are presumed to be attributable to the presence in the hydrogel of the preponderance of the monomer moieties containing a heterocyclic, nitrogen containing ring structure, i.e., the N-vinyl lactams and the heterocyclic N-vinyl monomers illustrated above. Employing a concentration of from 60% to 90% by weight of such monomer in the simultaneous copolymerization and cross-linking reaction yields a product which has the unique ability to retain as much as 95% of water as a homogeneous constituent of the resulting hydrogel. Increasing the cross-linking component in the final product (hydrogel) reduces the water content at equilibrium of the hydrogel and reduces flexibility. Mechanical stability is attained when a minimum of about 0.4% by weight of the cross-linking agent is employed in the reaction. The optimum properties and highest water transmission are attained with a water content of 80% to 95%, and this range is preferred for hydrogels to be used for the preparation of contact lenses. Such lenses are very transparent, i.e. clear to the point of invisibility, soft and are permeable to products of tissue metabolism. The water content of the hydrogels may be reduced below 80% and lower by subjecting the hydrogel product, shaped article, etc., to pressure with a reduction in volume or initial shape. When the water reduced hydrogel is reimmersed in water it swells back to its original volume or shape.

The hydrogels of the present invention may be formed in manifold shapes by employing various casting techniques. In other words, the mixture of the polymerized components may be cast in flat sheet form, in molds which will yield lenses or in rod form by casting in tubes.

The following examples will show how the hydrogels are prepared by employing a conventional type casting cell. In these examples various comonomers and other reactants were employed as indicated in the following tables wherein the numeral figures indicate parts by weight of the reactants employed. These tables also show the water content in the hydrogels, their clarity and water transmission.

A conventional type casting cell was prepared by inserting a soft and flexible vinyl gasket between two (2) pieces of polished plate glass, approximately one inch from the edge, and clamping with spring type clips, such as one inch binder clips or spring loaded clamps. The thickness of the gasket used should be approximately 20–30% greater than the desired thickness of the final cast sheet. The size of the glass plates selected will depend on the size of the sheet desired, and any size limitations in oven or heating bath to be used. For laboratory preparations, a typical glass size is 16″ x 16″ and a square, round or rectangular vinyl gasket with sides or a diameter of 0.080″ to 0.150″ is used to control sheet thickness.

The casting mixture consisting of monomers, catalyst, mold release agent if desired, is deaerated by the application of vacuum until air bubbles no longer rise to the surface. The deaerated casting mixture is then poured into the casting cell which is then sealed and placed horizontally on a shelf in a circulating air oven equipped with constant temperature control.

The cell is kept overnight in this oven preferably at 50–55° C. A hard sheet is obtained which is then cured inside the cell for one hour at approximately 100° C. The mold is allowed to cool to room temperature, the clips removed, and the mold pried open to release a clear, colorless and rigid sheet.

It is to be noted that if a definite curved shape is desired, the evacuated monomer casting mixture may be filled into a two (2) piece glass mold and then cured in an oven. Rods are obtained by curing the casting mixture in tubes. Hollow hydrogel tubes can be cast in between two glass tubes spaced concentrically, or by centrifugal casting procedure under polymerization conditions.

TABLE I.—EFFECT OF COMONOMER VARIATION

| | | | | | | | | | |
|---|---|---|---|---|---|---|---|---|---|
| Vinyl pyrrolidone | 80 | 80 | 80 | 80 | 80 | 80 | 80 | 80 | 80 |
| Tetraethylene glycol dimethacrylate | .2 | .2 | .2 | .2 | .2 | .2 | .2 | .2 | .2 |
| VAZO[1] catalyst | .4 | .4 | .4 | .4 | .4 | .4 | .4 | .4 | .4 |
| Vinyl acetate | 20 | | | | | | | | |
| Methyl acrylate | | 20 | | | | | | | |
| Ethyl acrylate | | | 20 | | | | | | |
| Butyl acrylate | | | | 20 | | | | | |
| Methyl methacrylate | | | | | 20 | | | | |
| Hydroxyethyl methacrylate | | | | | | 20 | | | |
| Hydroxyethyl acrylate | | | | | | | 20 | | |
| Glycidyl methacrylate | | | | | | | | 20 | |
| Glyceryl methacrylate | | | | | | | | | 20 |
| Percent water in hydrogel at equilibrium, 25° C | 91.4 | 90.1 | 86.2 | 80.6 | 74.3 | 89.4 | 89.9 | 86.3 | 90.4 |
| Clarity | ([2]) | ([2]) | ([2]) | ([3]) | ([2]) | ([2]) | ([2]) | ([2]) | ([3]) |
| Water transmission | 205,000 | 200,000 | 175,000 | 80,000 | 90,000 | 180,000 | 195,000 | 170,000 | 195,000 |

[1] Brand name of azobisisobutyronitrile.
[2] OK.
[3] Opaque.

TABLE II.—MISCELLANEOUS MONOMERS REPLACING VINYL PYRROLIDONE

| | | | | | | |
|---|---|---|---|---|---|---|
| Vinyl pyrrolidone | 80 | | | 90 | | |
| Vinyl piperidone | | 80 | | | | |
| N-vinyl caprolactam | | | 80 | | | |
| N-vinyl morpholine | | | | | 90 | |
| N-vinyl glutarimide | | | | | | 85 |
| Hexaethylene glycol dimethacrylate | | | | .4 | .4 | |
| Tetraethylene glycol dimethacrylate | 0.2 | .2 | .2 | | | .4 |
| Ethyl acrylate | | | | 10 | ,10 | 15 |
| Methyl acrylate | 20 | 20 | 20 | | | |
| VAZO catalyst | 0.4 | .4 | .4 | .4 | .4 | .4 |
| Water content at equilibrium, 25° C | 90.1 | 89.8 | 86.0 | 90.3 | 90.0 | 89.2 |
| Water permeability | 205,000 | 195,000 | 160,000 | 200,000 | 185,000 | 180,000 |

TABLE III.—EFFECT OF PERCENTAGE OF CROSS-LINKING AGENT

| | | | |
|---|---|---|---|
| Vinyl pyrrolidone | 80 | 80.0 | 80.0 |
| Methyl acrylate | 20 | 20.0 | 20.0 |
| Tetraethylene glycol dimethacrylate | .2 | 1.0 | 4.0 |
| VAZO catalyst | .4 | .4 | .4 |
| Water content at equilibrium at 25° C., percent | 90.1 | 80.7 | 66.6 |
| Flexibility | ([1]) | ([2]) | ([3]) |
| Water permeability | 205,000 | 145,000 | 75,000 |

[1] Very flexible.
[2] Moderately flexible.
[3] Stiff.

TABLE III—Continued

| | | | | | | | |
|---|---|---|---|---|---|---|---|
| Vinyl pyrrolidone | 99.0 | 99 | 99 | 98 | 96 | 92 | 88 |
| Tetraethylene glycol dimethacrylate | .02 | .2 | 1.0 | 2.0 | 4.0 | 8.0 | 12.0 |
| VAZO | .4 | .4 | .4 | .4 | .4 | .4 | .4 |
| Flexibility | (¹) | (¹) | (¹) | (¹) | (²) | (²) | (²) |
| Percent water content of hydrogel at equilibrium, at 25° C | 94.6 | 94.5 | 93.5 | 86.8 | 78.0 | 64.3 | 52.6 |

¹ Very flexible.
² Stiff.

From the foregoing specification and illustrative examples, it becomes clearly evident that by simultaneously copolymerizing and cross-linking the reactants, hydrogels are obtained of coherent and homogenous structures.

Interesting and useful polymeric structures can also be prepared from the reactant mixture employed in accordance with the present invention by conducting the simultaneous copolymerization and cross-linking reaction in casts or molds, including compression molds of the solution of the reactants in the organic solvent by conventional polymerization procedures in the absence of air and by taking precautions during the reaction to prevent the evaporation or escape of any substantial amounts of the organic solvent. The latter can be accomplished in the customary manner by closing the molds or by conducting the reaction under substantially saturated solvent conditions in casts or molds which predetermine the shape of the solid gel structure.

The transition from the solid gel structure to the hydrogel of a water content as high as 95% is dependent primarily on the amount, i.e. from 60%–90% by weight of the N-vinyl lactam and the aforementioned heterocyclic N-vinyl monomer and only secondarily on the amount of cross-linking agent that is employed in the reaction. As the amount of the cross-linking agent increases above 1% by weight, based on the total weight of the two copolymerizing monomers, the swellability of the cross-linked product decreases below 80%, but never below 35%. An amount below 1% by weight decreases the degree of cross-linking and consequently the swellability increases to slightly above 95%, usually about 97%.

I claim:

1. The process of preparing a hydrophilic cross-linked copolymer which comprises heating a mixture consisting essentially of from 60% to 90% by weight of a heterocyclic N-vinyl monomer containing a carbonyl functionality adjacent to the nitrogen in its heterocyclic moiety and selected from the class consisting of N-vinyl lactam, N-vinyl succinimide, N-vinyl diglycolylimide, N-vinyl glutarimide, N-vinyl-3-morpholinone and N-vinyl-5-methyl-3-morpholinone, 10% to 40% by weight of comonomer selected from the class of vinyl esters and acrylate esters, and from about 0.5% to about 12% by weight, based on the total weight of the comonomer mixture of said heterocyclic N-vinyl monomer and said ester, of a polyethylene glycol dimethacrylate as cross-linking agent and heating said mixture to a temperature ranging from about ambient to about 70° C. in the absence of atmospheric oxygen and in the presence of free radical catalyst for a period of time sufficient to yield the said copolymer.

2. The process according to claim 1 wherein the heterocyclic N-vinyl monomer is N-binyl-2-pyrrolidone.

3. The process according to claim 1 wherein the heterocyclic N-vinyl monomer is N-vinyl-ε-caprolactam.

4. The process according to claim 1 wherein the heterocyclic N-vinyl monomer is N-vinyl-2-piperidone.

5. The process according to claim 1 wherein the heterocyclic N-vinyl monomer is N-vinyl-3-morpholinone.

6. The process according to claim 1 wherein the heterocyclic N-vinyl monomer is N-vinyl glutarimide.

7. The product prepared in accordance with the process of claim 1.

8. The product prepared in accordance with the process of claim 2.

9. The product prepared in accordance with the process of claim 3.

10. The product prepared in accordance with the process of claim 4.

11. The product prepared in accordance with the process of claim 5.

12. The product prepared in accordance with the process of claim 6.

References Cited

UNITED STATES PATENTS

| 2,976,576 | 3/1961 | Wichterle et al. | 18—58 |
| 3,220,960 | 11/1965 | Wichterle | 260—2.5 |
| 3,423,367 | 1/1969 | Merijan et al. | 260—66 |

JOSEPH L. SCHOFER, Primary Examiner

S. M. LEVIN, Assistant Examiner

U.S. Cl. X.R.

260—86.1, 89.5